United States Patent [19]

Leingang

[11] 3,747,878
[45] July 24, 1973

[54] TRUNNION MOUNTING
[75] Inventor: Charles J. Leingang, Erie, Pa.
[73] Assignee: Lord Corporation, Erie, Pa.
[22] Filed: Dec. 3, 1971
[21] Appl. No.: 204,650

[52] U.S. Cl. ................................. 248/9, 308/26
[51] Int. Cl. ............................................. B60k 1/00
[58] Field of Search ...................... 248/7, 5, 9, 10, 248/26; 269/153; 180/64 R; 308/26; 287/85

[56] References Cited
UNITED STATES PATENTS

| 2,490,492 | 12/1949 | Tyler et al. | 248/5 |
| 3,633,856 | 1/1972 | Crews | 248/9 |
| 3,580,532 | 5/1971 | Schmitt | 180/64 R |
| 2,954,193 | 9/1960 | Loftis | 248/26 |
| 2,781,990 | 2/1957 | Via | 248/9 |
| 3,135,224 | 6/1964 | McLean | 248/9 X |
| 2,498,126 | 2/1950 | Koch | 248/26 |

FOREIGN PATENTS OR APPLICATIONS

| 54,183 | 4/1948 | France | 248/5 |
| 104,657 | 4/1937 | Australia | 248/5 |

Primary Examiner—J. Franklin Foss
Attorney—James W. Wright

[57] ABSTRACT

The load carrying ability, life and axial stability of an elastomeric trunnion mounting is enhanced by an improved resilient element. The mounting comprises a housing of segmental parts secured together and trunnion having opposed annular recesses in which is received an annular body of elastomer comprising segmental parts arranged end to end. Segmental relatively non-extensible bands are bonded to opposite sides of the elastomer body and project axially beyond the associated side of the elastomer body. The bands are seated in the opposed recesses. The end surfaces of the elastomer body diverge outward from the adjacent bands at an acute angle to define end surfaces which are convex in radial cross section.

5 Claims, 4 Drawing Figures

PATENTED JUL 24 1973 3,747,878

TRUNNION MOUNTING

This invention relates to a trunnion mounting and more particularly to an elastomeric trunnion mounting having improved load carrying ability, life and axial stability.

BACKGROUND

Elastomeric trunnion mountings are used extensively in supporting engines, and the like while providing vibration isolation therefor. There is described in Schmitt, U. S. Pat. No. 3,580,532, assigned to the assignee of the present invention, two such prior art elastomeric trunnion mountings. In each instance, the trunnion mounting comprises a housing having segmental parts secured together and having arcuate grooves arranged end to end which cooperate to provide an annular recess in the housing facing radially inward. A trunnion, typically an extension of an engine to be supported, is received in the housing and has an outer cylindrical surface opposed to and spaced radially inward from the annular recess. A metal band having segmental parts arranged end to end is seated in the housing annular recess and has an annular body of elastomer comprising segments bonded to the inside of the segmental metal bands, respectively, and bearing directly against the trunnion outer surface. The difference between the trunnion mountings described in the above referenced patent resides in the difference in geometry of the elastomer body. Preferably as indicated, the elastomer body is precompressed between the housing and trunnion. This precompression insures structural continuity between the housing and trunnion, resists rotational and axial slippage between the housing and trunnion and, perhaps most importantly, helps to improve service life. While both of these trunnion mountings have been found to perform satisfactorily, certain deficiencies have been noted. The primary deficiencies have been in rotational and axial slippage between the trunnion and elastomer body, particularily, where a lubricant gets between the elastomer body and trunnion, wear of the elastomer body at the interface with the trunnion, static and dynamic radial deflections and service life.

SUMMARY

Accordingly, it is the object of the present invention to provide an elastomeric trunnion mounting which alleviates the deficiencies previously mentioned.

Briefly, these deficiencies are alleviated in an elastomeric trunnion mounting comprising a housing having segmental parts secured together and having arcuate grooves arranged end to end and cooperating to provide an annular recess facing radially inward. The trunnion is received in the housing and has an outer cylindrical surface spaced radially inward from the housing annular recess. The outer trunnion surface has an annular recess disposed therein facing radially outward in opposed relation to the housing annular recess. An annular body of elastomer including segmental parts arranged end to end is disposed in the spaces provided by the annular recesses. Segmental relatively nonextensible bands, preferably of metal, are bonded to opposite sides of the elastomer body and project axially outside the associated side of the elastomer body. The bands are seated in the opposed recesses. The end surfaces of the elastomer body diverge outward at an acute angle to form a convex surface in radial cross section.

BRIEF DESCRIPTION OF DRAWINGS

Some of the objects of the invention having been stated, other objects will appear as the description proceeds, when taken in connection with the accompanying drawings, in which.

DETAIL DESCRIPTION OF INVENTION

Figure 1:
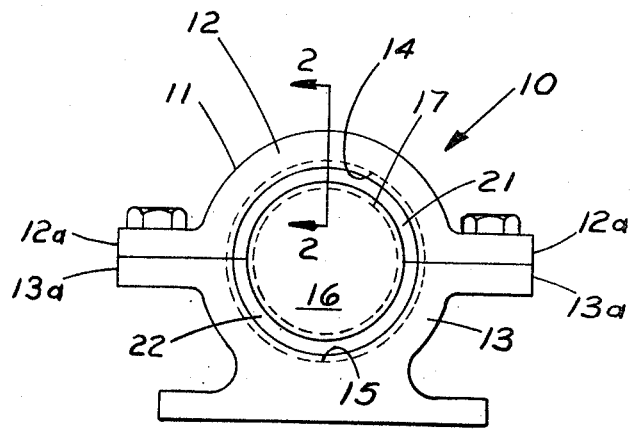
FIG. 1 is schematic front elevational view of a trunnion mounting of this invention.
Figure 2:
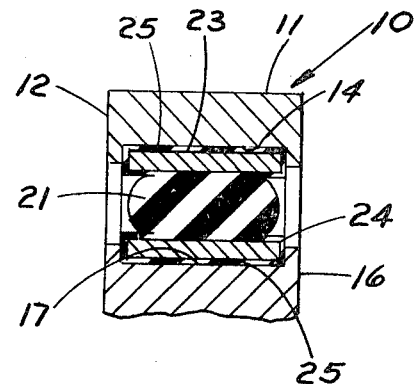
FIG. 2 is an enlarged sectional view taken substantially along the line 2—2 of FIG. 1.

With reference now to the various Figures wherein like reference characters are used to indicate like parts, there is shown in FIGS. 1 and 2 a trunnion mounting, generally indicated at 10, of the present invention. The trunnion mounting 10 includes a housing 11 which is split into upper and lower semi cylindrical segments 12 and 13. Each of the segments 12 and 13 have diametrically opposed outwardly projecting flanges 12a and 13a which are bolted or otherwise detachable secured together. Each of the segmental housing parts 12 and 13 have an arcuate groove 14 and 15, respectively, extending circumferentially of the inside of the parts 12 and 13 which are arranged end to end to provide an annular recess in the housing 11 facing radially inward.

The housing 11 will typically be rigidly mounted adjacent the structure to be supported whereby a trunnion 16 extending from the structure, such as an engine, is received in the housing 11. The trunnion 16 has an outer generally cylindrical surface spaced from the housing 11 having an annular recess 17 disposed therein and facing radially outward in opposed relation to the housing annular recess provided by grooves 14 and 15. Resilient means are disposed between the housing 11 and trunnion 16 for supporting the structure of which the trunnion 16 is an extension and provides vibration isolation therefor. Trunnion mountings 10 are primarily employed for torsional vibration isolation generated by the structure and transmitted to the trunnion mounting 10 via the trunnion 16. In addition to providing torsional vibration isolation, it is desirable to obtain some isolation normal to and along the trunnion 16 axis. Furthermore, it is desirable that the trunnion mounting 10 be relatively stiff radially of the trunnion 16 to minimize the static deflection caused by the weight of the structure and that no axial slippage occur between the housing 11 and trunnion 16. As will be apparent these latter aspects insure steadiness or stability of the structure. While steadiness of the structure is desired, the trunnion mounting 10 must be sufficiently compliant to function as a vibration isolator in the torsional mode.

Figure 3:
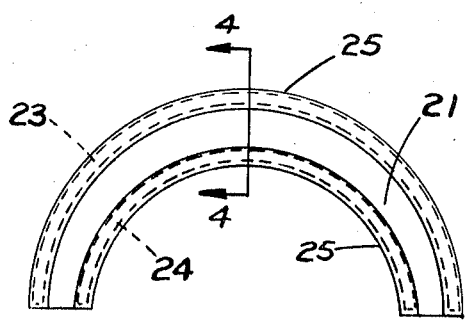
FIG. 3 is an enlarged front elevational view of the resilient element of the trunnion mounting of FIG. 1.
Figure 4:
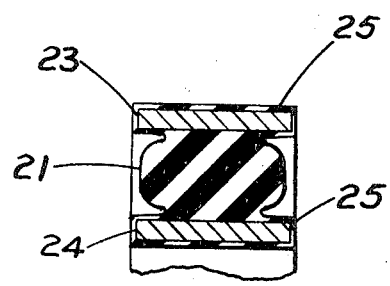
FIG. 4 is an enlarged sectional view taken substantially along the line 4—4 of FIG. 3.

With reference to FIGS. 2, 3 and 4 there is shown the resilient means for supporting the trunnion 16 within the housing 11 and providing the above desired features and others. The resilient means comprises an annular body of elastomer including a pair of semi-annular parts 21 and 22 arranged end to end in abutting relation and disposed adjacent respective segmental housing parts 12 and 13 in the spaces between and provided by the annular recesses in the housing 11 and trunnion 16. Coextensive concentrically spaced semi-annular relatively non-extensible bands 23 and 24 such as metal, plastic or the like are bonded to opposite sides of each of the semi-annular elastomer body parts 21 and 22. The bands 23 and 24 project axially outside the associated sides of the elastomer body parts 21 and 22 (FIGS. 2 and 4). The bands 23 and 24, preferably, have a width slightly less than the widths of the respective recesses (FIG. 2). Each of the bands 23 and 24 preferably a skin 25 of elastomer integral with the elastomer body parts 21 and 22 surrounding and bonded to the bands 23 and 24. The elastomer coated bands 23 and 24 are seated in the opposed recesses. The skin 25 of elastomer conforms to any surface irregularities of the recesses, provides a tight seat or seal between the bands 23 and 24 and the associated recesses and protects the bands 23 and 24 from environmental attack.

The circumferential contour of the bands 23 and 24 and elastomer body parts 21 and 22 are such as to comply with the respective contours of the annular recesses. However, the combined thickness of the elastomer body parts 21 and 22, bands 23 and 24 and skins 25 of elastomer should be greater than the space provided by said opposed recesses whereby said elastomer body parts 21 and 22 are placed under radial compression upon securement of said segmental housing parts 11 and 12 (FIG. 2).

With reference to FIG. 4, there is shown the preferred geometry of the elastomer body parts 21 and 22, only one of which is shown. As there illustrated, the end surfaces of the elastomer body parts diverge axially outward from the adjacent bands 23 and 24 at an acute angle so that the end surfaces are convex in radial cross section. Preferably as shown, the contour is generally semi-circular and tangent to the spaced bands 23 and 24. By this contour, the elastomer body parts 21 and 22 under radial compression loads bulges axially outward and rolls down into load-carrying contact with the opposed bands 23 and 24 outside the outer edge of the bond with the adjacent bands 23 and 24 (FIG. 2). This action prevents stress concentration in the elastomer body parts 21 and 22 adjacent the bands 23 and 24 and the greater the radial compressive load, the greater the load-carrying ability of the elastomer body parts 21 and 22. For a more detail description of the advantages associated with the above described elastomer body contour, reference is made to Beck, U. S. Pat. No. 3,584,858, assigned to the assignee of the present invention.

While the geometry of elastomer body parts 21 and 22 are generally the same as that disclosed in Schmitt, U. S. Pat. No. 3,580,532 and previously discussed, it has been found that by bonding non-extensible bands 23 and 24 to both sides of the elastomer body parts 21 and 22 and having these bands 23 and 24 seated in opposed recesses in the housing and trunnion that substantial improvement in performance of the trunnion mounting 10 has been obtained. The seating of the bands 23 and 24 in the annular recesses provided in the housing 11 and trunnion 16 provide a positive interconnection which prevents axial slippage between the housing 11 and trunnion 16. While relative axial movement is allowed by deflection of the elastomer body, the housing 11 and trunnion will be resiliently returned to their normal position upon removal of the displacing force. Since axial slippage is not permitted between the elastomer body and trunnion 16, wear of the elastomer body is eliminated. By the tight seal provided by the skin 25 of elastomer on the bands 23 and 24, lubricant is prevented from getting into the recesses and reducing the frictional resistance to relative rotational slippage between the housing 11 and trunnion 16. In addition by providing bands 23 and 24 on opposite sides of the elastomer body, the load-carrying capacity of the elastomer body has been enhanced. That is, the bond between the bands and elastomer body tend to restrain axial bulging of the elastomer body. It can be seen from the foregoing description that a very steady trunnion mounting 10 has been provided without sacrificing the torsional vibrational isolation properties. In addition, by the elimination of wear and increasing the load-carrying ability (less compression strain), the service life of the trunnion mounting 10 has been enhanced over prior art elastomer trunnion mountings.

In the drawings and specification, there has been set forth a preferred embodiment of the invention and, although specific terms are employed, they are used in a generic and descriptive sense only and not for purposes of limitation.

What is claimed is:

1. A mounting comprising a housing having segmental parts detachably secured together and having arcuate grooves disposed therein arranged end to end and cooperating to provide an annular recess facing radially inward, a trunnion having an outer surface spaced radially inward from said housing annular recess, said outer trunnion surface having an annular recess disposed therein facing radially outward in opposed relation to said housing annular recess, an annular body of elastomer comprising segmental parts arranged end to end disposed in the space provided by said annular recesses, coextensive concentrically spaced segmental relatively non-extensible bands bonded to opposite sides of said body of elastomer and projecting axially outside the associated side of said body of elastomer, said bands being seated in said opposed recesses and cooperating with said trunnion and housing, respectively, for maintaining relative axial relation therebetween, the end surfaces of said body of elastomer diverging outward from the adjacent band at an acute angle in a radially uncompressed condition so that said body of elastomer when subjected to a radial compression load bulges axially outward and rolls down into load-carrying relation with the adjacent band outside the outer edge of its bond and increases the load-carrying area of said body of elastomer and prevents stress concentration in said body of elastomer adjacent said bonds.

2. The mounting, according to claim 1, wherein the combined radial thickness of said body of elastomer and said bands is greater than the space provided by said opposed annular recesses whereby said body of elastomer is placed under radial compression between said housing and trunnion.

3. The mounting, according to claim 1, including a skin of elastomer intergal with said body of elastomer surrounding and bonded to said bands.

4. The mounting, according to claim 1, wherein the end surfaces of said body of elastomer are convex in radial cross section.

5. A mounting comprising a housing having semi-cylindrical segmental parts detachably secured together and having arcuate grooves disposed therein arranged end to end and cooperating to provide an annular recess facing radially inward, a trunnion having an outer cylindrical surface spaced radially inward from said housing annular recess, said outer trunnion surface having an annular recess disposed therein facing radially outward in opposed relation to said housing annular recess, an annular body of elastomer comprising semi-annular parts disposed in respective segmental housing parts and arranged end to end in the space provided by said annular recesses, coextensive concentrically spaced semi-annular relatively non-extensible bands bonded to opposite sides of each of said semi-annular elastomer body parts and projecting axially outside the associated sides of said semi-annular elastomer body parts, a skin of elastomer integral with said semi-annular elastomer body parts surrounding and bonded to said bands, said bands being seated in said opposed recesses and cooperating with said trunnion and housing, respectively, for maintaining relative axial relation therebetween, the end surfaces of said semi-annular elastomer body parts being convex in radial cross section in a radially uncompressed condition so that said body of elastomer when subjected to a radial compression load bulges axially outward and rolls down into load-carrying relation with said spaced bands and increases the load-carrying area of said body of elastomer and prevents stress concentration in said body of elastomer adjacent said bands, the combined thickness of said body of elastomer, bands and skins of elastomer being greater than the space provided by said opposed recesses whereby said body of elastomer is placed under radial compression between said housing and trunnion.

\* \* \* \* \*